July 3, 1956          H. ERNST          2,752,827

CONTROL MECHANISM FOR CONTOURING MACHINES

Filed May 26, 1954          3 Sheets-Sheet 1

INVENTOR.
HANS ERNST
BY
*H. K. Parsons & C. W. Wright*
ATTORNEYS

INVENTOR.
HANS ERNST
BY
H. K. Parsons & L. W. Wright
ATTORNEYS

July 3, 1956

H. ERNST 2,752,827

CONTROL MECHANISM FOR CONTOURING MACHINES

Filed May 26, 1954

INVENTOR.
HANS ERNST
BY
N. K. Parsons & C. W. Wright.
ATTORNEYS

United States Patent Office 2,752,827
Patented July 3, 1956

2,752,827

CONTROL MECHANISM FOR CONTOURING MACHINES

Hans Ernst, Cincinnati, Ohio, assignor to The Cincinnati Milling Machine Co., Cincinnati, Ohio, a corporation of Ohio Application May 26, 1954, Serial No. 432,343

7 Claims. (Cl. 90—13.5)

This invention relates to improvements in automatic contour reproducing machines and has particular reference to the mechanism for controlling the contouring operations of the machine. Present-day requirements for machines of this type, particularly when utilized for quantity production purposes, demand that the machine be capable of high speed operation to within the capacity of the machine for the metal cutting or stock removal operations as respects a work piece but without sacrifice of the accuracy of pattern reproduction when operating on irregular contours or following sharp changes in direction of the controlling pattern. The moving parts of such machines and the workpieces are frequently quite heavy and massive, thus developing a momentum when operating at fast cutting speeds which must be effectively overcome and accurately controlled during appreciable change in resultant relative direction of movement of work and cutting tool.

It is, therefore, one of the objects of the present invention to provide an improved actuating and control mechanism for machines of this character which will permit utilization of maximum feed rates during cutting in any constant direction, but which will automatically slow down the rate of relative movement of work and cutter as approach is made to the point at which any pronounced change in direction is to take place.

A further object of the invention is the provision of a mechanism of this character in which both the general contouring operation and the desired slowing down, as at points of appreciable contour change, may be automatically controlled by improved pattern contour following tracer mechanisms.

Another object of the invention is the provision of a structure for accomplishment of the above purposes in which a single pattern or contour determining element may be utilized for control of both the contouring and the slowing down or accelerating movements of the machine.

An additional object of the present invention is the provision of a type of circuit control mechanism for accomplishment of the above results which may be readily added to or substituted for the controls of existing commercial contouring machines.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
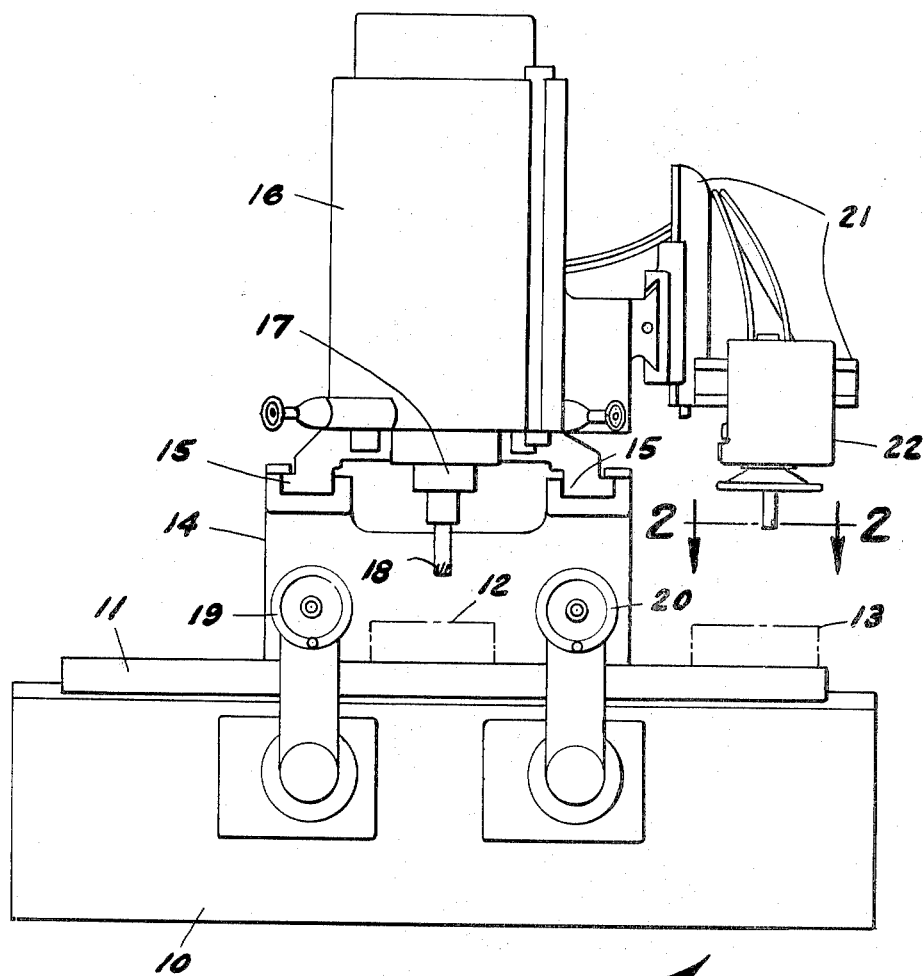
Figure 1 is a front elevation of one form of machine for utilization of the present invention.

In the drawings the numeral 10 designates the base or bed of a contouring machine of the "Hydro-tel" type. Longitudinally movable on this bed is the table 11 adapted to support the workpiece 12 and the controlling template or pattern 13. Rising from the bed is a column portion 14 having ways 15 guiding for in and out movement the ram 16 having a rotatable spindle 17 supporting the cutter 18. The hand wheels 19 and 20 carried by the bed afford manual control respectively of the longitudinal movement of the table and the in and out movement of the ram in the conventional manner. Supported on the ram 16 by the adjustable bracket elements 21 is the tracer head or box 22.

Contained within this box 22 is the hydraulically rotatable drive motor 23 having a gear 24 operatively engaging the driven gear 25 on sleeve 26, rotatably supported by the box 22 and through key 27 driving the tracer head sleeve 28. The sleeve 28 is provided with socket 29, mounting for universal tilting movement the hemispherical bearing 30 keyed for rotation with sleeve 28 by the pin 31. This bearing 29 is formed integral with or mounted upon and serves to support the contour controlling tracer finger 32 having a tubular lower portion at 33 connected by the passage or bore 34 with the valve chamber 35 at the upper portion of the tracer finger.

At its upper end the tracer finger 32 is provided with a conical seat 36 for the ball 37 cooperating with the opposed conical seat 38 at the lower end of the valve 39 which controls the operation of the motor 23. A spring 40 bearing at one end against the plug 41 carried by the casing or box 22 and at the other against the valve 39, serves to urge the valve downwardly, pressing the seat 38 firmly against ball 37.

Carried by the upper end of the tracer finger 32 is the distributor head 42 having a pair of exhaust passages 43 and 44, communicating with the exhaust conduit 45.

The wall of the valve chamber 35 is formed with the groove 46 communicating through the interdrilled porting 47 in the distributor head 42 with the pressure control conduit 48. It will be noted that the distributor head 42 is rotatably mounted on the upper end of the tracer finger for bodily movement with the finger and that the conduits 45 and 48 have been shown as flexible to permit of such movement without disturbing the hydraulic circuit connections.

Figure 4:
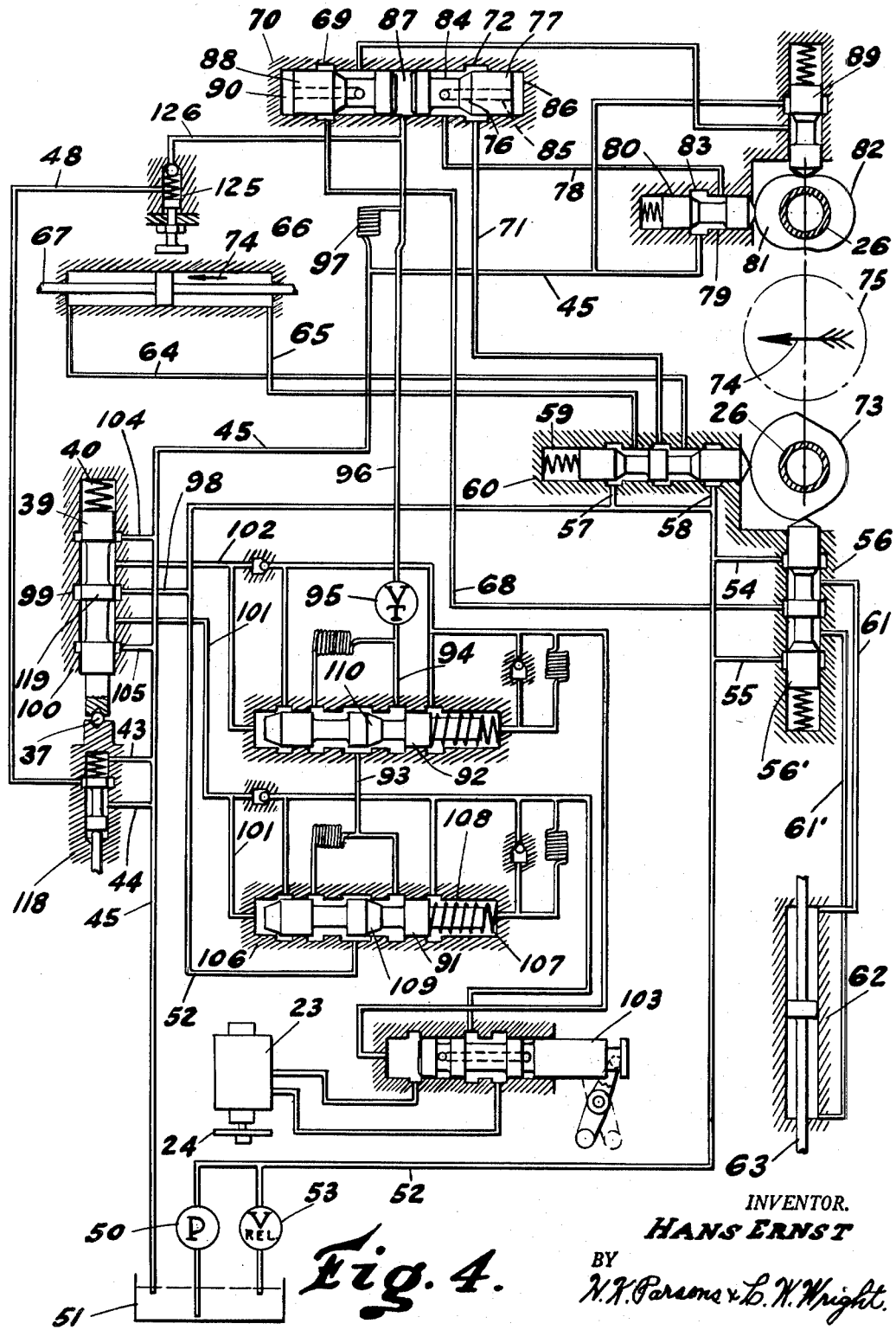
Figure 4 is a diagrammatic view of the complete hydraulic actuation and control circuit.

The general hydraulic circuit and associate parts in connection with which this invention has been illustrated as utilized are of the type shown in co-pending application, Serial No. 395,498, now Patent No. 2,713,246 issued July 19, 1955, and are particularly illustrated in Figure 4 of the drawings. As there shown, the pressure pump 50 supplied from reservoir 51 delivers hydraulic actuating medium into the pressure conduit system designated as an entirety by the reference character 52 at a pressure valve determined by the relief valve 53. Branch conduits 54 and 55 couple the pressure conduit 52 to the input grooves of reversing valve bushing 56, and similar branch conduits 57 and 58 couple the pressure conduit to bushing 59 of the second reversing valve 60. Leading intermediately from bushing 56 are the conduits 61 and 61' coupled to opposite ends of the hydraulic motor 62 whose piston rod 63 is coupled to ram 16 for effecting in and out movement of the ram. Correspondingly, conduits 64 and 65 from bushing 59 are coupled to opposite ends of the hydraulic motor 66 whose piston rod 67 is coupled to the table 11 for effecting reciprocation of the table. When valve 56 is moved into position to couple one or the other of the pressure conduits 54 to 61 or 61', the opposite conduit will be connected by way of the valve and conduit 68 to groove 69 in the balancing or shutoff valve bushing 70.

Similarly, when motor conduit 64 or 65 is connected by valve 60 with one of the pressure conduits, the other of the motor conduits will be connected by way of the valve 60 and conduit 71 to groove 72 of the bushing 70.

The position of the valves 56 and 60 for determining the neutralization or the opposite or reverse couplings of pressure and exhaust as respects motor 62 and motor 66 is determined by the contour of the rotary reverse controlling cam 73 on sleeve 26. However, as shown in Figure 4, these valves are positioned 90 degrees phased so that, depending on the rotation of the cam they may be simultaneously shifted into an outward or an inward position or various intermediate relationships, it being understood that the actual relative direction of movement of work and tool is the resultant of the rate and direction of operation of the pair of hydraulic motors 62 and 66. In the particular instance shown in the drawings, valve 60 has been moved to the left to couple pressure with the right hand side of motor 66 so that the table will be moving in the direction indicated by the arrow 74. At this time the valve 56 is at an intermediate or crossover point so that no movement is being effected as respects motor 62.

By reference to Figure 4 it will be noted that the return flow from the operating motor 66 is through conduit 64, 71, groove 72 past the throttling portion 76 of valve 77 and conduit 78 to the bore of bushing 79 containing throttling valve 80. As shown, valve 80 is held in an open position by one of the lobes 81 of cam 82 so that the pressure may discharge by way of groove 83 into the discharge conduit system 45 and thence to reservoir 51. The valve 80 is preferably a slit type throttle construction such that the in and out movement of the valve creates a variable resistance to flow from the conduit 78 to the conduit 45, creating a back pressure or intermediate pressure condition in the chamber 84 of the valve bushing 76. This pressure reacts through bore 85 formed in the right hand portion of the valve into the piston chamber 86, tending to move the valve 77 into closed or increased throttling position in opposition to any pressure condition existing in the space 87 intermediate the head ends of the valves 77 and 88. A similar pressure balancing condition exists and serves independently to control the position of the valve 88, depending on the flow conditions effected by outward movement of the rate valve 89 as effected by rotation of the lobes of cam 82.

From the foregoing it will be evident that the direct pump pressure is coupled in a substantially unrestricted manner to the motors 62 and 66 so that the pressure existing at the grooves 69 and 72 is substantially constant pump pressure while the control of actual rate of movement of the respective motors is determined by the combined flow resistances created by the position of the valves 77 and 88 and the motor load resistances.

The effective pressure existing in the space 87 reacts against the valves 77 and 88 to resist their inward or closing movement as effected by the pressure in the piston chambers 86 and 90. This pressure is supplied from the main pressure line 52 by way of the serially interposed valves 91 and 92, intermediate conduit 93, conduit 94, variable throttle 95 and conduit 96. Movement of either valve 91 or 92 toward closed position will impart an additional restriction or resistance to flow into 96 while the variable throttle 95 determines the pressure drop from 94 to 96. A fixed resistance at 97 controls the discharge from 96 to reservoir conduit 45 so that the effective pressure in 87 is an intermediate pressure whose value is determined by the various resistances interposed between pressure input conduit 52 and the exhaust conduit 45. Pressure increases in 96—87 tend to open the valves 77 and 88, permitting greater flow, while decreases in pressure allow the valves to move into a closed or shutoff position. Under normal cutting conditions the pressure balance is established by setting of the throttle 95. On tracer effected shiftings of valve 39 there is a concomitant closing of either valve 91 or of valve 92 effective to reduce the pressure conditions, allowing the valves 77 and 88 to move toward closed position.

As has been mentioned, the valve 39 controls the operation of steering motor 23. In effecting this result, the pressure conduit 52 is coupled by branch 98 with groove 99 of the valve bushing 100. Extending from the valve bushing are the conduits 101 and 102 coupled by way of the motor short circuiting valve 103 with motor 23. Branch conduits 104 and 105 ported into bushing 100 provide hydraulic connection to the reservoir conduit 45. Movement of valve 39 in an upward direction from the neutral position shown in Figure 4 will couple pressure conduit 98 to motor conduit 101, and the other motor conduit 102 by way of conduit 104 to exhaust conduit 45. Movement of the valve 39 in the opposite direction will reverse the pressure and exhaust connections as respects the motor conduits. Conduit 101 is connected to bushing 106 in a manner to react against the left end of valve 91 so that when this conduit is under pressure the valve will be shifted to the right against the action of spring 107 and the pressure existing in chamber 108, permitting flow to motor 23 and at the same time moving the throttle portion 109 of valve 91 to the right to restrict the pressure flow into conduit 93, thus causing a drop of pressure in the area 87.

Similarly, when pressure is introduced into conduit 102 it will react on valve 92, closing throttle portion 110, restricting the flow to reduce pressure in the area 87 so that the valves 77 and 88 may move into exhaust or return flow throttling position to slow down or stop the operation of motors 62 and 66.

The details of a control circuit of this character have been specifically illustrated and described in co-pending application Serial No. 395,498.

While a circuit of this character has been found adequate to take care of necessary slowing down of operation of motors 62 and 66 under many commercial operating conditions, it has been found that maximum accuracy can be obtained, particularly when utilizing high feed rates and when abrupt changes of direction are to be made, by providing a supplemental anticipatory rate control mechanism for sensing these changes before there has been appreciable pattern effected movement of the normal control tracer finger 32. In the attainment of this result there is pivoted within the tubular portion 33 of the tracer 32 a supplemental tracer lever 111. This lever is carried by the pivot 112 for bodily movement with the tracer finger 32 while capable of independent oscillatory movement with respect to such tracer finger. At its lower end it is provided with the supplemental pattern contacting tracer tip 113 having a screw threaded portion 114 engaged in the arm 111 for relative adjustment of the parts. A nut 115 served to lock the contact 113 in its adjusted position.

Figure 2:
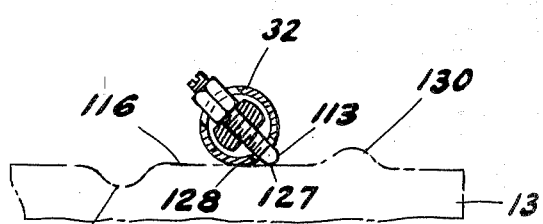
Figure 2 is a sectional view on the line 2—2 of Figure 1.
Figure 3:
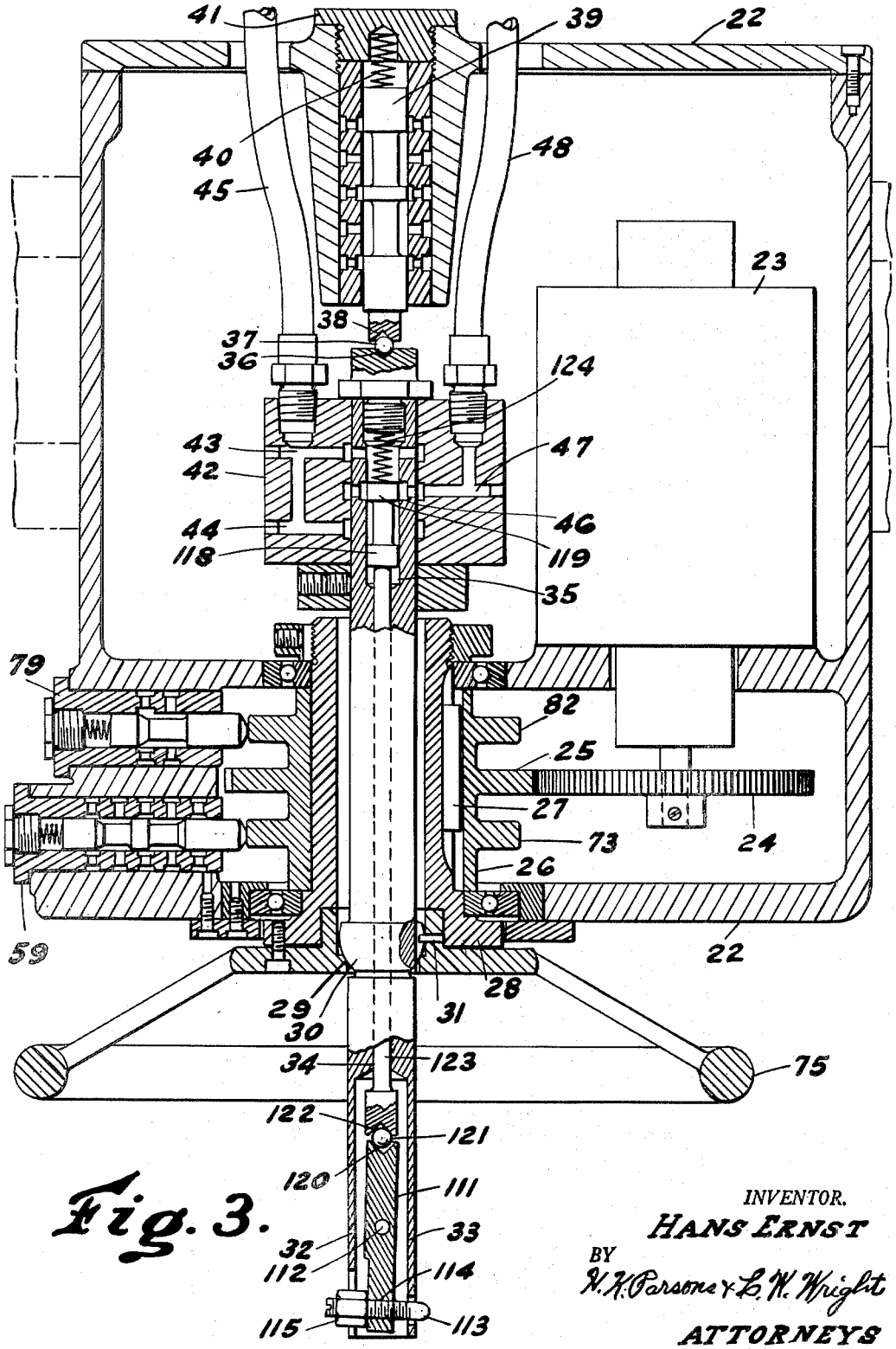
Figure 3 is an enlarged vertical sectional view through one form of combination tracer control mechanism.

As indicated in Figure 2, under ordinary conditions the tracer 32 rides on the contour 116 of the control pattern 117, and when moving along a straight surface, the tip 113 will engage the pattern surface 116 and be deflected an amount such as indicated in Figure 3 so that the valve 118 is held with its spool portion 119 in an intermediate position as shown in Figures 3 and 4, blocking off flow from conduit 48 to the branches 43 and 44 of reservoir conduit 45. This positioning of the valve is effected by reaction of the cone seat 120 of arm 111 against ball 121 fitting in cone seat 122 at the lower end of the valve rod 123, vertically slidable in bore 34 of the tracer finger. Spring 124 urges the valve downward in the valve chamber 35 while additive deflection of the supplemental tracer finger 111 will tend to raise the valve from its neutral position so that either positive or negative deflections of the tip 113 will control shifting of spool 119 in a position to couple 48 with 45.

It will be noted that a conduit 48 is coupled through the adjustable throttling or relief valve 125 with branch conduit 126 from conduit 96.

During relative traversing movement of the tracer finger 32 and pattern 117, the supplemental contact tip 113 has been indicated as engaging the pattern surface at the point 127 somewhat in advance of the point 128 of ordinary engagement between the tracer 32 and the pattern. Consequently, as the tracer structure approaches either a depression such as 129 or a protuberance, such as 130, or more abrupt changes of direction, as when making a right angle change, the tip 113 will engage and detect the change of patter contour prior to the engagement of said contour change of the pattern by the main tracer tip 32. Spring 40 is sufficiently heavy to hold the main tracer in steady position in contact with the pattern when the diagonal direction of movement of the tip 113 relative to the main tracer finger 30 is effected due to increase or relief of pressure between tracer tip 113 and pattern as the pattern contour changes. This movement or deflection of the tip 113 will react on the valve 118 to connect conduits 48 and 45 by way of 43 or 44. Flow will take place from 96 through 126, 48, and 43 or 44 to 45. This will effect a bypassing of the resistance 97 and a consequent pressure drop at 87, permitting the throttling or blocking valves 77 and 88 to move into an increased throttling or blocking position, slowing down or stopping the operation of the motors 62 and 66 prior to the engagement of the main tracer tip 32 with the change of pattern contour such as 129 or 130 and therefore prior to any action of the serially disposed valves 91 and 92 which are under control of the main tracer. This suplemental tracer controlled slowing down or stopping of the slide operating motors will remain effective until such time as the main tracer steering effected rotation produced by operation of the motor 23 is adequate to modify or restore the displacement of the finger 113 with respect to the main tracer 32 an amount sufficient to shift the valve 118 to its neutral position, restoring variable rate control to the main tracer action by blocking off the by-pass flow or pressure relief by way of conduit 48.

It will thus be seen that there has been produced an improved and efficient machine for performance of high speed or other profiling and contouring operations embodying a specific tracer mechanism for automatic control of slow-down operations during changes of contour which may be carried by the main tracer for movement therewith and movement relative thereto so that both the general contouring operations and the specific desired slow-down effects may be produced by the same pattern but with either joint or independent reaction of the individual tracers one with respect to the other.

The general control pattern operation has been shown as diagrammatic in form and the particular contact with the individual tracer portions may be on one and the same pattern or the control contours may be in the form of independent pattern outlines. Also, while the two tracers have been shown as in interfitting or telescoping relationship, the essence of the invention in a broad aspect resides in the dual tracer functioning and operation as shown irrespective of the particular relationship and mounting of the tracer elements. Likewise, it will be appreciated that while for purposes of illustration the parts under control of the finger 113 and lever 111 have been shown as effecting control of a hydraulic circuit, that the broad concept of the invention resides in employment of the supplemental anticipatory rate control finger which is equally employable with any known electric, electronic, or other rate control circuits or mechanisms.

What is claimed is:

1. An automatic contour reproducing machine including a pair of slides, hydraulic motors for actuating said slides, a hydraulic actuating circuit for said motors, valve means in the circuit for determining the directional actuation and proportional rates of actuation of said motors, a first tracer means including a first deflectable tracer connected with said valve means to control the positioning of said valve means, additional valve means in said circuit for restricting the flow through the circuit, and additional pattern controllable tracer means including a second deflectable tracer connected with said flow restricting valve means for controlling the flow-determining positioning thereof, said second deflectable tracer being mounted on said first deflectable tracer for movement therewith and relative thereto.

2. A contouring machine tracer control, including a support, a primary tracer, means mounting the primary tracer on the support for deflection relative thereto, a slide movement controlling valve carried by the support, connections between the tracer and valve for operation of the valve upon deflection of the tracer relative to the support, a distributor head carried by and movable with the tracer, a control valve in the head, an auxiliary tracer mounted on the primary tracer for bodily movement therewith and deflecting movement relative thereto, and valve positioning means carried by the primary tracer and connecting said valve and auxiliary tracer for variably positioning said valve in accordance with movement of the auxiliary tracer relative to the main tracer.

3. A tracer mechanism for control of automatic reproducing machines including a tracer head, an oscillatable tracer carried by the head having a deflectable pattern contour following finger for determination of contouring movements of the reproducing machine, an auxiliary pattern engaging finger mounted on said deflectable pattern following finger for movement therewith and movement relative thereto, and machine rate controlling means coupled with said auxiliary finger and actuable thereby upon movement of the auxiliary finger with respect to its supporting pattern following finger for varying the rate of machine movement during oscillatable tracer determined contouring movement.

4. A tracer mechanism for control of automatic reproducing machines including a tracer head, an oscillatable tracer carried by the head having a pattern contour following finger for determination of contouring movements of the reproducing machine, an auxiliary pattern engaging finger mounted on said pattern following finger for movement therewith and movement relative thereto, and machine rate controlling means coupled with said auxiliary finger and actuable thereby upon movement of the auxiliary finger with respect to its supporting pattern following finger for varying the rate of machine movement during oscillatable tracer determined contouring movement, said machine rate controlling means including a slide controlling hydraulic circuit, a blocking valve in the circuit, and blocking valve position controlling means intervening the auxiliary pattern contacting finger and said valve for determining the position of the blocking valve in accordance with pattern effected displacements of the auxiliary finger with respect to the pattern contour following finger.

5. A tracer controlled contouring machine including a pair of slides, means supporting the slides for movement in relatively perpendicular paths, actuating means for effecting movement of the slides, and control mechanism for said actuating means including a rotatable tracer support, a main tracer oscillatably mounted on the support having a pattern contacting portion, means for rotating the tracer and its support, control valve mechanism operable by oscillation of the tracer with respect to its support for determining the extent of actuation of the tracer support rotating means, means actuable by rotation of the tracer support for determining the resultant direction of movement of the slides, an auxiliary pattern tracer carried by the oscillatable tracer for rotation and oscillation therewith, said auxiliary tracer having a pattern contacting portion located in proximity to the pattern contacting portion of the main tracer, means mounting the auxiliary tracer on the main tracer for oscillator movement with and relative to the main tracer, and control mechanism coupled with the auxiliary tracer and actuable upon movement of the auxiliary tracer with respect to the main tracer for varying the rate of a resultant movement of the slides.

6. A tracer controlled contouring machine including a pair of slides, means supporting the slides for movement in relatively perpendicular paths, actuating means for effecting movement of the slides, and control mechanism for said actuating means including a rotatable tracer support, a main tracer oscillatably mounted on the support having a pattern contacting portion, means for rotating the tracer and its support, control valve mechanism operable by oscillation of the tracer with respect to its support for determining the extent of actuation of the tracer support rotating means, means actuable by rotation of the tracer support for determining the resultant direction of movement of the slides, an auxiliary pattern tracer carried by the oscillatable tracer for rotation and oscillation therewith, said auxiliary tracer having a pattern contacting portion located in proximity to the pattern contacting portion of the main tracer, means mounting the auxiliary tracer on the main tracer for oscillator movement with and relative to the main tracer, and control mechanism coupled with the auxiliary tracer and actuable upon movement of the auxiliary tracer with respect to the main tracer for varying the rate of a resultant movement of the slides, said means including a valve mechanism supported by the main tracer and movable therewith, and motion transmitting means intervening the auxiliary tracer and said valve mechanism for actuation of the valve mechanism upon movement of the auxiliary tracer with respect to the main tracer.

7. A tracer controlled contouring machine including a pair of slides, means supporting the slides for movement in relatively perpendicular paths, actuating means for effecting movement of the slides, and control mechanism for said actuating means including a rotatable tracer support, a main tracer oscillatably mounted on the support having a pattern contacting portion, means for rotating the tracer and its support, control valve mechanism operable by oscillation of the tracer with respect to its support for determining the extent of actuation of the tracer support rotating means, means actuable by rotation of the tracer support for determining the resultant direction of movement of the slides, an auxiliary pattern tracer carried by the oscillatable tracer for rotation and oscillation therewith, said auxiliary tracer having a pattern contacting portion located in proximity to the pattern contacting portion of the main tracer, means mounting the auxiliary tracer on the main tracer for oscillator movement with and relative to the main tracer, control mechanism coupled with the auxiliary tracer and actuable upon movement of the auxiliary tracer with respect to the main tracer for varying the rate of a resultant movement of the slides, said means including a valve mechanism supported by the main tracer and movable therewith, and motion transmitting means intervening the auxiliary tracer and said valve mechanism for actuation of the valve mechanism upon movement of the auxiliary tracer with respect to the main tracer, and a distributor head rotatably mounted on the main tracer in circumscribing relation to said valve means, pressure and exhaust conduits ported into said distributor head and connected thereby to the valve mechanism carried by the tracer, said tracer carried valve mechanism including a valve spool actuable by the auxiliary tracer having an intermediate blocking position preventing flow from the pressure to the exhaust conduit and effective when moved in either direction from said blocking position to interconnect said conduits.

References Cited in the file of this patent

UNITED STATES PATENTS

| 1,999,787 | Sassen | Apr. 30, 1935 |
| 2,706,892 | Fritschi et al. | Apr. 26, 1955 |
| 2,713,246 | Dall et al. | July 19, 1955 |

FOREIGN PATENTS

| 448,337 | Great Britain | June 5, 1936 |
| 505,470 | Great Britain | May 11, 1939 |